United States Patent
Matsunobu et al.

(10) Patent No.: US 12,227,630 B2
(45) Date of Patent: Feb. 18, 2025

(54) METHOD OF PRODUCING POROUS BODY OF WATER-INSOLUBLE POLYMER

(71) Applicant: TOYOTA JIDOSHA KABUSHIKI KAISHA, Toyota (JP)

(72) Inventors: Kohei Matsunobu, Toyota (JP); Akio Minakuchi, Okazaki (JP); Hiroshi Uyama, Suita (JP); Chiaki Yoshizawa, Suita (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 716 days.

(21) Appl. No.: 16/998,664

(22) Filed: Aug. 20, 2020

(65) Prior Publication Data
US 2021/0061970 A1    Mar. 4, 2021

(30) Foreign Application Priority Data
Aug. 29, 2019    (JP) .................................. 2019-156314

(51) Int. Cl.
C08J 9/28    (2006.01)
(52) U.S. Cl.
CPC ................ *C08J 9/286* (2013.01); *C08J 9/28* (2013.01); *C08J 2201/0502* (2013.01); *C08J 2329/04* (2013.01)

(58) Field of Classification Search
CPC ............ C08J 2201/05; C08J 2201/0502; C08J 9/28–286
See application file for complete search history.

(56) References Cited

U.S. PATENT DOCUMENTS

| | | |
|---|---|---|
| 3,450,650 A | 6/1969 | Murata |
| 5,238,636 A | 8/1993 | Furukawa et al. |
| 5,409,785 A | 4/1995 | Nakano et al. |
| 5,863,645 A | 1/1999 | Misoo et al. |
| 6,177,181 B1 * | 1/2001 | Hamada ............. B01D 69/1216 526/341 |

(Continued)

FOREIGN PATENT DOCUMENTS

| | | |
|---|---|---|
| CN | 1894029 A | 1/2007 |
| CN | 101137422 A | 3/2008 |

(Continued)

OTHER PUBLICATIONS

Machine translation of JP H0448507 by Ishibashi et al. (Year: 1992).*

(Continued)

*Primary Examiner* — Christina H.W. Rosebach
(74) *Attorney, Agent, or Firm* — Sughrue Mion, PLLC

(57) ABSTRACT

Provided is a method of producing a porous body of a water-insoluble polymer, the method being excellent in terms of simplicity. The method of producing a porous body of a water-insoluble polymer disclosed here includes the steps of: preparing a solution in which a water-insoluble polymer is dissolved in a mixed solvent containing a good solvent for the water-insoluble polymer and a poor solvent for the water-insoluble polymer; and removing the mixed solvent from the solution by vaporization. The poor solvent has a boiling point higher than a boiling point of the good solvent. A porous body is obtained by removing the mixed solvent by vaporization to form pores.

12 Claims, 2 Drawing Sheets

5μm

(56) References Cited

U.S. PATENT DOCUMENTS

| | | | |
|---|---|---|---|
| 6,287,730 | B1 | 9/2001 | Callahan et al. |
| 6,464,351 | B1 | 10/2002 | Landry-Coltrain et al. |
| 6,718,165 | B1 | 4/2004 | Ha |
| 8,183,337 | B1 * | 5/2012 | Pacetti .................. C08F 6/22 528/495 |
| 2002/0028320 | A1 | 3/2002 | Iwasa et al. |
| 2003/0215624 | A1 | 11/2003 | Layman et al. |
| 2004/0241550 | A1 | 12/2004 | Wensley et al. |
| 2005/0020699 | A1 | 1/2005 | Isobe et al. |
| 2005/0186479 | A1 | 8/2005 | Totsuka et al. |
| 2006/0081530 | A1 | 4/2006 | Beard |
| 2006/0148911 | A1 | 7/2006 | Mattingley et al. |
| 2007/0036959 | A1 | 2/2007 | Yamato et al. |
| 2007/0128424 | A1 | 6/2007 | Omori et al. |
| 2012/0141877 | A1 | 6/2012 | Choi et al. |
| 2013/0058858 | A1 | 3/2013 | Uyama et al. |
| 2013/0280583 | A1 | 10/2013 | Lee et al. |
| 2014/0311984 | A1 | 10/2014 | Nakama |
| 2015/0306539 | A1 | 10/2015 | Yamato |
| 2016/0104900 | A1 | 4/2016 | Imashiro |
| 2018/0175353 | A1 | 6/2018 | Sakimoto et al. |
| 2018/0251627 | A1 | 9/2018 | Schmitt |
| 2019/0367699 | A1 | 12/2019 | Minakuchi et al. |
| 2020/0044217 | A1 | 2/2020 | Minakuchi et al. |
| 2020/0350574 | A1 | 11/2020 | Ha et al. |
| 2021/0061969 | A1 | 3/2021 | Matsunobu et al. |

FOREIGN PATENT DOCUMENTS

| | | |
|---|---|---|
| CN | 102487137 A | 6/2012 |
| CN | 104999745 A | 10/2015 |
| CN | 106299209 A | 1/2017 |
| CN | 109346656 A | 2/2019 |
| CN | 110518283 A | 11/2019 |
| EP | 3 786 222 A1 | 3/2021 |
| EP | 3 786 223 A1 | 3/2021 |
| EP | 3 805 298 A1 | 4/2021 |
| EP | 3 851 188 A1 | 7/2021 |
| FR | 3041352 A1 | 3/2017 |
| JP | 4-48507 A | 2/1992 |
| JP | 5-168880 A | 7/1993 |
| JP | 5-309959 A | 11/1993 |
| JP | 6-76838 A | 3/1994 |
| JP | 8-311771 A | 11/1996 |
| JP | 10-116630 A | 5/1998 |
| JP | 10-278417 A | 10/1998 |
| JP | 2000-103886 A | 4/2000 |
| JP | 2000-296668 A | 10/2000 |
| JP | 2001-088432 A | 4/2001 |
| JP | 2001-260520 A | 9/2001 |
| JP | 2001-270946 A | 10/2001 |
| JP | 2001-325951 A | 11/2001 |
| JP | 2004-356102 A | 12/2004 |
| JP | 2005-213315 A | 8/2005 |
| JP | 2005-533884 A | 11/2005 |
| JP | 2006-179205 A | 7/2006 |
| JP | 2006-306945 A | 11/2006 |
| JP | 2006-331759 A | 12/2006 |
| JP | 2006-338918 A | 12/2006 |
| JP | 2007-518867 A | 7/2007 |
| JP | 2008-056905 A | 3/2008 |
| JP | 2011-137183 A | 7/2011 |
| JP | 2011-165574 A | 8/2011 |
| JP | 2011-236292 A | 11/2011 |
| JP | 2014-234496 A | 12/2014 |
| JP | 2017-25294 A | 2/2017 |
| JP | 2019-79822 A | 5/2019 |
| JP | 2019-206667 A | 12/2019 |
| JP | 2020-24811 A | 2/2020 |
| KR | 10-2001-0038737 A | 5/2001 |
| KR | 10-2006-0042119 A | 5/2006 |
| KR | 10-2006-0116323 A | 11/2006 |
| KR | 10-1198806 B1 | 11/2012 |
| KR | 10-2016-0065692 A | 6/2016 |
| KR | 10-1872094 B1 | 7/2018 |
| WO | 89/08679 A1 | 9/1989 |
| WO | 2005/123599 A2 | 12/2005 |
| WO | 2007/126242 A1 | 11/2007 |
| WO | 2008130705 A1 | 10/2008 |
| WO | 2011/138937 A1 | 11/2011 |
| WO | 2014/106954 A1 | 7/2014 |
| WO | 2014/199880 A1 | 12/2014 |

OTHER PUBLICATIONS

Machine translation of CN 103981633 by Ye et al. (Year: 2014).*
"Substance Detail—CAS Registry No. 96-48-0" by Scifinder (Year: 2023).*
Lebo, R. Porperties of Mixtures of Isopropyl Alcohol and Water. . J. Am. Chem. Soc. 1921, 43, 5, 1005-1011 (Year: 1921).*
Wypych, George. (2008; 2012; 2019). Knovel Solvents—A Properties Database. ChemTec Publishing. Retrieved from https://app.knovel.com/hotlink/toc/id:kpKSAPD005/knovel-solvents-properties/knovel-solvents-properties (Year: 2019).*
Notice of Allowance issued Feb. 9, 2022 in U.S. Appl. No. 17/001,753.
Tai-Horng Young et al., "Preparation of EVAL membranes with smooth and particulate morphologies for neuronal culture", BIOMATERIALS, vol. 22, No. 13, Jul. 1, 2001, pp. 1771-1777 (7 pages total).
Guowei Wang et al., "Mesoporous poly (ethylene-co-vinyl alcohol) monolith captured with silver nanoparticles as a SERS substrate: facile fabrication and ultra-high sensitivity", RSC Advances, vol. 5, No. 33, published Mar. 5, 2015, pp. 25777-25780 (4 pages total).
Virginia Muriel-Galet et al., "Antimicrobial food packaging film based on the release of LAE from EVOH", International Journal of Food Microbiology, vol. 157, No. 2, May 5, 2012, pp. 239-244 (6 pages total).
Non Final Office Action dated Jul. 26, 2021, issued by the U.S. Patent and Trademark Office in U.S. Appl. No. 17/001,753.
Final Office Action dated Nov. 9, 2021 issued in U.S. Appl. No. 17/001,753.
Sun et al., "The role of pre-evaporation in the preparation process of EVOH ultrafiltration membranes via TIPS", Journal of Membrane Science, vol. 563, Jun. 4, 2018, pp. 238-246 (9 pages total).
Pervin Rumlaya et al., "Tailoring pore distribution in polymer films via evaporation induced phase separation", RSC Advances, 2019, vol. 9, No. 27, pp. 15593-15605 (13 pages total).
Wang et al., "Reactive poly(ethylene-co-vinyl alcohol) monoliths with tunable pore morphology for enzyme immobilization", Colloid Polym Sci, 2015, vol. 293, pp. 2429-2435 (7 pages total).
Guowei Wang, "Title Fabrication of Poly(ethylene-co-vinyl alcohol) Monoliths via Thermally Induced Phase Separation and Their Applications", Jul. 31, 2015 (Jul. 31, 2015), XP055761556, DOI: 10.18910/54010 (81 pages total).
Bai Qiuhong et al., "Hierarchical porous cellulose/activated carbon composite monolith for efficient adsorption of dyes", Cellulose, Springer Netherlands, Netherlands, vol. 24, No. 10, Jul. 29, 2017 (Jul. 29, 2017), pp. 4275-4289, XP036319834 (15 pages total).

* cited by examiner

METHOD OF PRODUCING POROUS BODY OF WATER-INSOLUBLE POLYMER

BACKGROUND OF THE INVENTION

1. Field of the Invention

The present disclosure relates to a method of producing a porous body of a water-insoluble polymer. The present application claims priority to Japanese Patent Application No. 2019-156314 filed on Aug. 29, 2019, the entire contents of which are incorporated into the present specification by reference.

2. Description of the Related Art

Porous bodies of water-insoluble polymers can exhibit a variety of characteristics, such as lightness, shock-absorbing properties, thermal insulation properties, sound absorption properties, separation properties and adsorption properties. Therefore, porous bodies of water-insoluble polymers have been used in a wide variety of applications, such as packing materials, construction materials, sound-absorbing materials, cleaning articles, cosmetic products, separation membranes, adsorbent materials, carriers for purification, catalyst carriers and culture carriers.

From perspectives such as production costs, it is desired for a method of producing a porous body of a water-insoluble polymer to be simple. As a method capable of producing a porous body of poly(vinylidene fluoride), which is a water-insoluble polymer, in a simple manner, Japanese Patent Application Publication No. 2011-236292 discloses a method of producing a porous body of poly(vinylidene fluoride), which includes preparing a solution by dissolving poly(vinylidene fluoride) in a mixed solvent of a good solvent for the poly(vinylidene fluoride) and a poor solvent for the poly(vinylidene fluoride) while heating, cooling the solution to obtain a molded body, immersing the molded body in another solvent to replace the mixed solvent with the other solvent, and then removing the other solvent by drying.

SUMMARY OF THE INVENTION

As a result of diligent research, the inventors of the present disclosure have found that the production method of the prior art had further room for improvement in terms of producing a porous body in a simple manner.

Therefore, an object of the present disclosure is to provide a method of producing a porous body of a water-insoluble polymer, the method being excellent in terms of simplicity.

The method of producing a porous body of a water-insoluble polymer disclosed here includes the steps of: preparing a solution in which a water-insoluble polymer is dissolved in a mixed solvent containing a good solvent for the water-insoluble polymer and a poor solvent for the water-insoluble polymer; and removing the mixed solvent from the solution by vaporization. The poor solvent has a boiling point higher than a boiling point of the good solvent. A porous body is obtained by removing the mixed solvent by vaporization to form pores.

According to such a constitution, it is possible to produce a porous body of a water-insoluble polymer by the simple procedure of preparing a solution of a water-insoluble polymer and vaporizing a mixed solvent. That is, provided by such a constitution is a method of producing a porous body of a water-insoluble polymer, the method being excellent in terms of simplicity.

DESCRIPTION OF THE PREFERRED EMBODIMENTS

Figure 1:
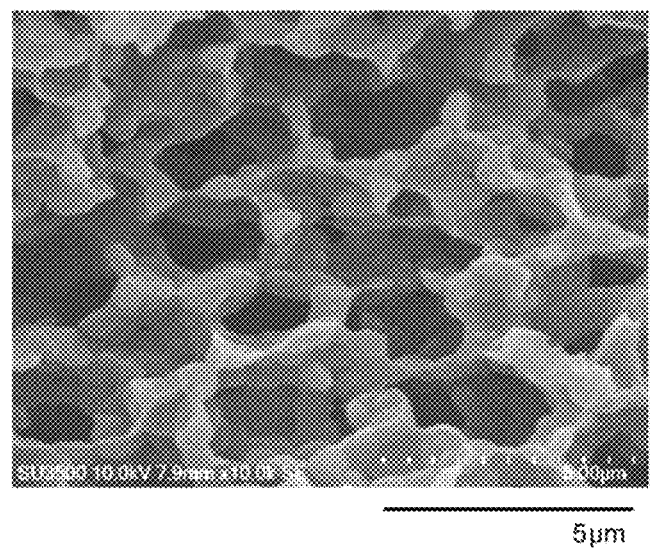
FIG. 1 is a SEM photograph of a cross section of a thin film obtained in Example 1.

A method of producing a porous body of a water-insoluble polymer of the present disclosure includes the steps of: preparing a solution in which a water-insoluble polymer is dissolved in a mixed solvent containing a good solvent for the water-insoluble polymer and a poor solvent for the water-insoluble polymer (hereinafter referred to as a "solution preparation step"); and removing the mixed solvent from the solution by vaporization (hereinafter referred to as a "mixed solvent removal step"). Here, the poor solvent has a boiling point higher than a boiling point of the good solvent. A porous body is obtained by removing the mixed solvent by vaporization to form pores.

First, an explanation will be given of the solution preparation step. In the present disclosure, the "good solvent for the water-insoluble polymer" is a solvent in which the solubility of the water-insoluble polymer at 25° C. is 1 mass % or more. The solubility of the water-insoluble polymer in the good solvent at 25° C. is desirably 2.5 mass % or more, more desirably 5 mass % or more, further desirably 7.5 mass % or more, and most desirably 10 mass % or more. It should be noted that the type of good solvent to be used in the present disclosure is selected, as appropriate, according to the type of water-insoluble polymer. It is possible to use a single good solvent in isolation or a mixed solvent obtained by mixing two or more types of good solvents.

In the present disclosure, the "poor solvent for the water-insoluble polymer" is a solvent in which the solubility of the water-insoluble polymer at 25° C. is less than 1 mass %. The solubility of the water-insoluble polymer in the poor solvent at 25° C. is desirably 0.5 mass % or less, more desirably 0.2 mass % or less, further desirably 0.1 mass % or less, and most desirably 0.05 mass % or less. The type of poor solvent to be used in the present disclosure is selected, as appropriate, according to the type of water-insoluble polymer. It is possible to use a single poor solvent in isolation or a mixed solvent obtained by mixing two or more types of poor solvents.

It is possible to use a Hansen solubility parameter (HSP) in order to assess whether a specific solvent is a good solvent or a poor solvent for a specific polymer compound. For example, if the dispersion term, polarity term and hydrogen bonding term of the HPS of the polymer compound are denoted by $\delta_{D1}$, $\delta_{P1}$ and $\delta_{H1}$ respectively and the dispersion term, polarity term and hydrogen bonding term of the HPS of the solvent are denoted by $\delta_{D2}$, $\delta_{P2}$ and $\delta_{H2}$ respectively, the solubility of the polymer compound tends to increase as the distance Ra ($MPa^{1/2}$) between the HSPs of the polymer compound and that of the solvent, as represented by the formula below, decreases.

$$Ra^2 = 4(\delta_{D1} - \delta_{D2})^2 + (\delta_{P1} - \delta_{P2})^2 + (\delta_{H1} - \delta_{H2})^2$$

In addition, if the interaction radius of the specific polymer compound is denoted by $R_0$, it is predicted that the polymer compound will be soluble if the ratio $Ra/R_0$ is less than 1, partially soluble if the ratio $Ra/R_0$ is 0, and insoluble if the ratio $Ra/R_0$ is greater than 1.

Alternatively, it is possible to assess whether a specific solvent is a good solvent or a poor solvent for a specific polymer compound by carrying out a test involving mixing the polymer compound and the solvent in a sample bottle or the like.

The good solvent and the poor solvent are mixed and used as a homogeneous solvent. Therefore, the good solvent and the poor solvent are compatible with each other. In the present disclosure, the boiling point of the poor solvent being used is higher than the boiling point of the good solvent being used. From the perspective of enabling a homogeneous porous body having a relatively high porosity to be obtained easily, the boiling point of the poor solvent is desirably at least 10° C. higher, and more desirably at least 90° C. higher, than the boiling point of the good solvent. From the perspective of drying speed, the boiling point of the poor solvent is desirably lower than 300° C.

In the present disclosure, the term "water-insoluble polymer" means a polymer that has a solubility in water of less than 1 mass % at 25° C. The solubility of the water-insoluble polymer in water at 25° C. is desirably 0.5 mass % or less, more desirably 0.2 mass % or less, and further desirably 0.1 mass % or less.

The "water-insoluble polymer" used in the solution preparation step is the same as the water-insoluble polymer that constitutes the porous molded body. A polymer for which a good solvent and a poor solvent exist is used as the water-insoluble polymer. The type of water-insoluble polymer to be used is not particularly limited as long as a good solvent and a poor solvent for the polymer exist. Examples of water-insoluble polymers include olefin-based resins such as polyethylene and polypropylene; fluorine-based resins such as poly(vinyl fluoride) and poly(vinylidene fluoride); (meth) acrylic-based resins such as poly(methyl (meth)acrylate) and poly(ethyl (meth)acrylate); styrene-based resins such as polystyrene, styrene-acrylonitrile copolymers and acrylonitrile-butadiene-styrene copolymers; water-insoluble cellulose derivatives such as ethyl cellulose, cellulose acetate and cellulose propionate; vinyl chloride-based resins such as poly(vinyl chloride) and ethylene-vinyl chloride copolymers; and ethylene-vinyl alcohol copolymers. It is possible to use a polymer that has been rendered water-insoluble through modification of a water-soluble polymer. Of these, the water-insoluble polymer is desirably an aliphatic polymer compound (that is, a polymer compound having no aromatic ring) from the perspectives of usability of a porous body of the water-insoluble polymer and usability of a simple method of producing same. From the perspective of enabling a homogeneous porous body having a relatively high porosity to be obtained easily, the water-insoluble polymer is desirably an addition polymerization type polymer compound (that is, a polymer compound produced by polymerization of an ethylenically unsaturated double bond in a monomer having the ethylenically unsaturated double bond; for example, a vinyl-based polymer or vinylidene-based polymer). The water-insoluble polymer is desirably an ethylene-vinyl alcohol copolymer from the perspectives of usability of a porous body having a three-dimensional network type porous structure and usability of a simple method of producing same.

The average degree of polymerization of the water-insoluble polymer is not particularly limited, but is desirably not less than 70 but not more than 500,000, and more desirably not less than 100 but not more than 200,000. It should be noted that the average degree of polymerization of the water-insoluble polymer can be determined using a publicly known method (for example, NMR measurements or the like).

Suitable good solvents and suitable poor solvents will now be explained in more detail mentioning specific water-insoluble polymers as examples. The production method of the present disclosure can be advantageously carried out by using the good solvents and poor solvents explained below with the water-insoluble polymers given below.

1. Case where Water-Insoluble Polymer is Ethylene-Vinyl Alcohol Copolymer

An ethylene-vinyl alcohol copolymer (EVOH) is a copolymer containing ethylene units and vinyl alcohol units as monomer units. The content of ethylene units in the EVOH is not particularly limited, but is desirably 10 mol % or more, more desirably 15 mol % or more, further desirably 20 mol % or more, and particularly desirably 25 mol % or more. On the other hand, the content of ethylene units in the EVOH is desirably 60 mol % or less, more desirably 50 mol % or less, and further desirably 45 mol % or less. The degree of saponification of the EVOH is not particularly limited, but is desirably 80 mol % or more, more desirably 90 mol % or more, and further desirably 95 mol % or more. The upper limit for the degree of saponification is determined by technical limitations relating to saponification and is, for example, 99.99 mol %. It should be noted that the content of ethylene units and the degree of saponification in the EVOH can be determined using a publicly known method (for example, $^1$H-NMR measurements or the like).

In addition, EVOHs are generally produced by saponifying copolymers of ethylene and vinyl esters using an alkali catalyst or the like. As a result, EVOHs can contain vinyl ester units. Vinyl esters in such units are typically vinyl acetate, and may also be vinyl formate, vinyl propionate, vinyl valerate, vinyl caprate, vinyl laurate, and the like. In addition to ethylene units, vinyl alcohol units and vinyl ester units, the EVOH may also contain other monomer units as long as the advantageous effect of the present disclosure is not significantly impaired.

Examples of suitable good solvents for the EVOH include dimethyl sulfoxide (DMSO) and mixed solvents of water and alcohols. The alcohol used in the mixed solvent is desirably propyl alcohol. The propyl alcohol may be n-propyl alcohol or isopropyl alcohol. Therefore, a particularly suitable good solvent is DMSO or a mixed solvent of water and propyl alcohol.

Examples of suitable poor solvents for the EVOH include cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether and 2-ethoxyethanol; and diols such as 1,3-butane diol, 1,4-butane diol, 1,5-pentane diol and 1,6-hexane diol. Of these, cyclic esters, cyclic carbonates, cyclic sulfones and ether group-containing monools are desired, γ-butyrolactone, propylene carbonate, sulfolane and ether group-containing monools are more desired, and γ-butyrolactone and sulfolane are further desired. The solubility parameter (Hildebrand SP value) δ of the poor solvent is desirably at least 1.6 MPa$^{1/2}$ higher than the solubility parameter δ of the EVOH.

2. Case where Water-Insoluble Polymer is Cellulose Acetate

Examples of suitable good solvents for cellulose acetate include nitrogen-containing polar solvents (particularly, nitrogen-containing aprotic polar solvents) such as N,N-dimethylformamide, N,N-dimethylacetamide and N-methylpyrrolidone; esters such as methyl formate and methyl acetate; ketones such as acetone and cyclohexanone; cyclic ethers such as tetrahydrofuran, dioxane and dioxolane; glycol derivatives such as methyl glycol and methyl glycol acetate; halogenated hydrocarbons such as methylene chloride, chloroform and tetrachloroethane; cyclic carbonates such as propylene carbonate; and sulfur-containing polar solvents (particularly, sulfur-containing aprotic polar solvents) such as DMSO. Of these, a sulfur-containing aprotic polar solvent is desired, and DMSO is more desired.

Examples of suitable poor solvents for cellulose acetate include alcohols such as 1-hexanol, 1,3-butane diol, 1,4-butane diol, 1,5-pentane diol and 1,6-hexane diol. A monohydric or dihydric alcohol having 4 to 6 carbon atoms is desired as the alcohol.

3. Case where Water-Insoluble Polymer is Poly(Vinylidene Fluoride)

Examples of suitable good solvents for poly(vinylidene fluoride) include nitrogen-containing polar solvents (particularly, nitrogen-containing aprotic polar solvents) such as N,N-dimethylformamide, N,N-dimethylacetamide and N-methylpyrrolidone; and sulfur-containing polar solvents (particularly, sulfur-containing aprotic polar solvents) such as DMSO. Of these, a nitrogen-containing aprotic polar solvent is desired, and N,N-dimethylformamide is more desired.

Examples of suitable poor solvents for poly(vinylidene fluoride) include alcohols such as 1-hexanol, 1,3-butane diol, 1,4-butane diol, 1,5-pentane diol, 1,6-hexane diol and glycerin; and cyclic ethers such as tetrahydrofuran, dioxane and dioxolane. A dihydric or trihydric alcohol having 3 to 6 carbon atoms is desired as the alcohol.

The usage quantities of the water-insoluble polymer, the good solvent and the poor solvent should be selected, as appropriate, according to the types thereof being used. The mixing amount of the water-insoluble polymer is desirably 1 part by mass or more, more desirably 5 parts by mass or more, and further desirably 10 parts by mass or more, relative to 100 parts by mass of the good solvent. On the other hand, the mixing amount of the water-insoluble polymer is desirably 40 parts by mass or less, more desirably 35 parts by mass or less, and further desirably 30 parts by mass or less, relative to 100 parts by mass of the good solvent. The mixing amount of the poor solvent is desirably 10 parts by mass or more, more desirably 20 parts by mass or more, and further desirably 30 parts by mass or more, relative to 100 parts by mass of the good solvent. On the other hand, the mixing amount of the poor solvent is desirably 400 parts by mass or less, more desirably 200 parts by mass or less, and further desirably 100 parts by mass or less, relative to 100 parts by mass of the good solvent. By altering these amounts, it is possible to control the state of pores (for example, porosity, pore diameter, and the like) in an obtained porous body.

In addition to the water-insoluble polymer and the mixed solvent, the solution of the water-insoluble polymer may further contain other components as long as the advantageous effect of the present disclosure is not significantly impaired.

The method for preparing the solution of the water-insoluble polymer is not particularly limited. It is possible to dissolve a water-insoluble polymer in a good solvent, then add a poor solvent and then mix until a homogeneous solution is obtained, or add a water-insoluble polymer to a mixed solvent of a good solvent and a poor solvent and dissolve the water-insoluble polymer in the mixed solvent. The solution can be prepared using a publicly known stirring device, mixing device, or the like. When preparing the solution of the water-insoluble polymer, it is possible to irradiate with ultrasonic waves, carry out heating, or the like. The heating temperature is, for example, not less than 40° C. but not more than 100° C. Is possible to prepare the solution of the water-insoluble polymer by heating, and then cool the solution in such a way that the good solvent and the poor solvent do not separate. In addition, this cooling is desirably carried out so that the water-insoluble polymer does not precipitate. This is because precipitated water-insoluble polymer can be an impurity.

Next, an explanation will be given of the mixed solvent removal step. In the mixed solvent removal step, the good solvent and the poor solvent are removed by vaporization (volatilization in particular). At this time, pores are formed by this operation, and particularly by the poor solvent, and a porous body of the water-insoluble polymer is obtained. Typically, pores are formed by, for example, phase separation between the water-insoluble polymer and the mixed solvent in which the poor solvent has become highly concentrated. Specifically, because the poor solvent has a higher boiling point than the good solvent, the good solvent is preferentially vaporized ahead of the poor solvent in this step. As the amount of good solvent decreases, the concentration of the poor solvent in the mixed solvent increases. Because the solubility of the water-insoluble polymer in the poor solvent is lower than in the good solvent, phase separation occurs between the water-insoluble polymer and the mixed solvent in which the poor solvent has become highly concentrated, and a porous skeleton of the water-insoluble polymer is formed. This phase separation may be spinodal decomposition. Therefore, a porous skeleton of the water-insoluble polymer is formed in the mixed solvent removal step. Finally, the good solvent is removed, the water-insoluble polymer is precipitated, the high boiling point poor solvent is removed through vaporization, and pores are produced. A porous body of the water-insoluble polymer is produced in this way. It should be noted that in order to effect phase separation between the water-insoluble polymer and the mixed solvent in which the poor solvent has become highly concentrated, the type and usage amount of the good solvent and the type and usage amount of the poor solvent should be appropriately selected.

The method for vaporizing the good solvent and the poor solvent is not particularly limited, and examples thereof include methods involving heating, methods involving leaving in a vacuum, methods involving heating under reduced pressure and methods involving air drying. These methods can be carried out in the same way as publicly known drying methods. From the perspective of ease of carrying out the procedure, a method involving heating is desired. The heating temperature is not particularly limited, but is desirably a temperature at which the mixed solvent does not boil and the water-insoluble polymer and the poor solvent do not decompose. Specifically, the heating temperature is, for example, 25° C. or higher, desirably 50° C. or higher, and more desirably 70° C. or higher. On the other hand, the heating temperature is, for example, 180° C. or lower, desirably 150° C. or lower, and more desirably 125° C. or lower. The heating time should be decided, as appropriate, according to the type of solvent and the heating temperature. While vaporizing the good solvent and the poor solvent, it is desirable to leave the solution of the water-insoluble polymer to stand.

In cases where a porous body having a predetermined shape is to be obtained, it is possible to place the solution of the water-insoluble polymer in a container having a shape corresponding to the predetermined shape and then use an appropriate heating method. In cases where a film-shaped porous body is to be obtained, it is possible to coat the solution of the water-insoluble polymer in a form of a thin film on a surface of a substrate and then use an appropriate heating method.

A porous body of the water-insoluble polymer can be obtained in the manner described above. The thus produced porous body can have a three-dimensional network-shaped porous structure. In the case of a thin film-shaped porous body in particular, the porous body can have a three-dimensional network-shaped porous structure in which pores are connected from one main surface of the thin film-shaped porous body to the other main surface. According to the production method of the present disclosure, it is possible to obtain a porous body having an average pore diameter of, for example, 0.5 µm or more (and particularly 0.9 µm or more or even 1.4 µm or more) and 5 µm or less (and particularly 4.2 µm or less or even 3.8 µm or less). It should be noted that the average pore diameter can be determined by taking an electron microscope photograph of a cross section of the porous body and determining the average pore diameter as the average value of the diameters of 100 or more pores. In cases where the cross section of a pore is aspherical, the average value of the maximum diameter and minimum diameter of the pore may be taken to be the pore diameter. According to the production method of the present disclosure, it is possible to obtain a porous body having a porosity of, for example, 15% or more (and particularly 42% or more, 51.5% or more, or even 61.5% or more) and less than 80% (and particularly less than 75%). It should be noted that the porosity can be calculated in accordance with a publicly known method using the true density and the apparent density.

Obtained porous bodies of water-insoluble polymers can be used in a variety of applications, depending on the type of water-insoluble polymer. Examples of applications include packing materials, construction materials, sound-absorbing materials, cleaning articles, cosmetic products, separation membranes, adsorbent materials, carriers for purification, catalyst carriers and culture carriers.

According to the present disclosure, it is possible to produce a porous body of the water-insoluble polymer using the simple procedures, namely preparing a solution of a water-insoluble polymer and vaporizing a good solvent and a poor solvent. In the present disclosure, it is not necessary to carry out a procedure of cooling so as to precipitate a molded body or a procedure of replacing a solvent, which was necessary in the prior art. Therefore, the method of producing a porous body of a water-insoluble polymer of the present disclosure is excellent in terms of simplicity.

EXAMPLES

Explanations will now be given of examples relating to the present disclosure, but it is not intended that the present disclosure is limited to these examples.

Example 1

Into a sample bottle, 1 g of an ethylene-vinyl alcohol copolymer ("Eval L171B" available from Kuraray Co., Ltd.; ethylene content 27 mol %, hereinafter abbreviated to "EVOH-1") was weighed out. To this was added 5 mL of a mixed solvent containing n-propyl alcohol (nPA) and water at a volume ratio of 7:3 as a good solvent and 1 mL of γ-butyrolactone (GBL) as a poor solvent. The sample bottle was heated to 80° C. to 90° C. and stirred until the EVOH-1 completely dissolved in these solvents, thereby obtaining a solution of EVOH-1. The solution of EVOH-1 was then cooled to 25° C. The solution of EVOH-1 was then coated on an aluminum sheet by casting. This was then placed in a drier set to 120° C. and heated, thereby removing the good solvent and the poor solvent by vaporization. A thin film was obtained on the aluminum sheet in this way. A cross section of the obtained thin film was observed using a scanning electron microscope (SEM), and thereby it was confirmed that the thin film was a porous body. For reference purposes, a SEM photograph of a cross section of the thin film obtained in Example 1 is shown in FIG. 1.

Example 2

A thin film was obtained using the same procedure as that used in Example 1, except that 4 mL of dimethyl sulfoxide (DMSO) was used as the good solvent and 2.5 mL of propylene carbonate (PC) was used as the poor solvent. A cross section of the obtained thin film was observed using a SEM, and thereby it was confirmed that the thin film was a porous body.

Example 3

Figure 2:
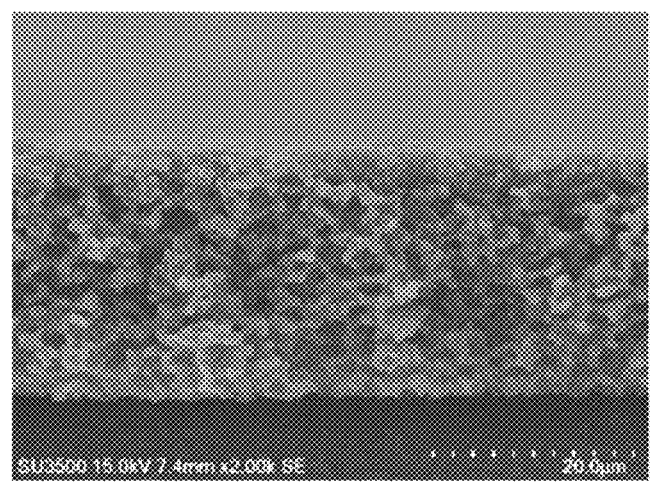
FIG. 2 is a SEM photograph of a cross section of a thin film obtained in Example 3.

A thin film was obtained using the same procedure as that used in Example 1, except that 5 mL of dimethyl sulfoxide (DMSO) was used as the good solvent and 2.5 mL of propylene carbonate (PC) was used as the poor solvent. A cross section of the obtained thin film was observed using a SEM, and thereby it was confirmed that the thin film was a porous body. For reference purposes, a SEM photograph of a cross section of the thin film obtained in Example 3 is shown in FIG. 2.

Example 4

A thin film was obtained using the same procedure as that used in Example 1, except that the amount of EVOH-1 was changed to 0.5 g, 2.5 mL of a mixed solvent containing n-propyl alcohol (nPA) and water at a volume ratio of 5:5 was used as the good solvent, and 1 mL of sulfolane was used as the poor solvent. A cross section of the obtained thin film was observed using a SEM, and thereby it was confirmed that the thin film was a porous body.

Example 5

A thin film was obtained using the same procedure as that used in Example 1, except that the amount of EVOH-1 was changed to 0.5 g, 2.5 mL of a mixed solvent containing n-propyl alcohol (nPA) and water at a volume ratio of 5:5 was used as the good solvent, and 1 mL of γ-butyrolactone (GBL) was used as the poor solvent. A cross section of the obtained thin film was observed using a SEM, and thereby it was confirmed that the thin film was a porous body.

Example 6

A thin film was obtained using the same procedure as that used in Example 1, except that the amount of EVOH-1 was changed to 0.5 g, 2.5 mL of a mixed solvent containing n-propyl alcohol and water at a volume ratio of 5:5 was used as the good solvent, and 1 mL of propylene glycol monomethyl ether (PGM) was used as the poor solvent. A cross section of the obtained thin film was observed using a SEM, and thereby it was confirmed that the thin film was a porous body.

Example 7

A thin film was obtained using the same procedure as that used in Example 1, except that 5 mL of a mixed solvent containing n-propyl alcohol (nPA) and water at a volume ratio of 3:7 was used as the good solvent, and 2 mL of sulfolane was used as the poor solvent. A cross section of the obtained thin film was observed using a SEM, and thereby it was confirmed that the thin film was a porous body.

Example 8

A thin film was obtained using the same procedure as that used in Example 1, except that 5 mL of a mixed solvent containing n-propyl alcohol (nPA) and water at a volume ratio of 3:7 was used as the good solvent, and 2 mL of γ-butyrolactone (GBL) was used as the poor solvent. A cross section of the obtained thin film was observed using a SEM, and thereby it was confirmed that the thin film was a porous body.

Example 9

A thin film was obtained using the same procedure as that used in Example 1, except that 5 mL of a mixed solvent containing n-propyl alcohol (nPA) and water at a volume ratio of 3:7 was used as the good solvent, and 2 mL of propylene glycol monomethyl ether (PGM) was used as the poor solvent. A cross section of the obtained thin film was observed using a SEM, and thereby it was confirmed that the thin film was a porous body.

Example 10

A thin film was obtained using the same procedure as that used in Example 1, except that 5 mL of a mixed solvent containing n-propyl alcohol (nPA) and water at a volume ratio of 5:5 was used as the good solvent, and 2 mL of 2-ethoxyethanol was used as the poor solvent. A cross section of the obtained thin film was observed using a SEM, and thereby it was confirmed that the thin film was a porous body.

Example 11

A thin film was obtained using the same procedure as that used in Example 1, except that 5 mL of a mixed solvent containing n-propyl alcohol (nPA) and water at a volume ratio of 3:7 was used as the good solvent, and 2 mL of 2-ethoxyethanol was used as the poor solvent. A cross section of the obtained thin film was observed using a SEM, and thereby it was confirmed that the thin film was a porous body.

Example 12

A thin film was obtained using the same procedure as that used in Example 1, except that 5 mL of dimethyl sulfoxide (DMSO) was used as the good solvent and 2.5 mL of 1,6-hexane diol was used as the poor solvent. A cross section of the obtained thin film was observed using a SEM, and thereby it was confirmed that the thin film was a porous body.

Example 13

A thin film was obtained using the same procedure as that used in Example 1, except that 5 mL of dimethyl sulfoxide (DMSO) was used as the good solvent and 2.5 mL of sulfolane was used as the poor solvent. A cross section of the obtained thin film was observed using a SEM, and thereby it was confirmed that the thin film was a porous body.

Example 14

A thin film was obtained using the same procedure as that used in Example 1, except that 5 mL of a mixed solvent containing n-propyl alcohol (nPA) and water at a volume ratio of 3:7 was used as the good solvent, and 2 mL of diethylene glycol monoethyl ether (DEGEE) was used as the poor solvent. A cross section of the obtained thin film was observed using a SEM, and thereby it was confirmed that the thin film was a porous body.

Example 15

A thin film was obtained using the same procedure as that used in Example 1, except that 5 mL of dimethyl sulfoxide (DMSO) was used as the good solvent and 2.5 mL of γ-butyrolactone (GBL) was used as the poor solvent. A cross section of the obtained thin film was observed using a SEM, and thereby it was confirmed that the thin film was a porous body.

Example 16

A thin film was obtained using the same procedure as that used in Example 1, except that "Eval E171B" available from Kuraray Co., Ltd. (ethylene content 44 mol %, hereinafter abbreviated to "EVOH-2") was used as the EVOH, 5 mL of dimethyl sulfoxide (DMSO) was used as the good solvent and 2.5 mL of γ-butyrolactone (GBL) was used as the poor solvent. A cross section of the obtained thin film was observed using a SEM, and thereby it was confirmed that the thin film was a porous body.

Example 17

Into a sample bottle, 1 g of cellulose acetate (available from Sigma-Aldrich, average molecular weight 50,000; CA) was weighed out. To this was added 5 mL of N,N-dimethylformamide (DMF) as a good solvent and 2.5 mL of 1,3-butane diol as a poor solvent. The sample bottle was heated to 80° C. to 90° C. and stirred until the cellulose acetate completely dissolved in these solvents, thereby obtaining a solution of cellulose acetate. The cellulose acetate solution was then cooled to 25° C. The cellulose acetate solution was then coated on an aluminum sheet by casting. This was then placed in a drier set to 120° C. and heated, thereby removing the good solvent and the poor solvent by vaporization. A thin film was obtained on the aluminum sheet in this way. A cross section of the obtained thin film was observed using a SEM, and thereby it was confirmed that the thin film was a porous body.

Example 18

A thin film was obtained using the same procedure as that used in Example 17, except that 2.5 mL of 1,4-butane diol was used as the poor solvent. A cross section of the obtained thin film was observed using a SEM, and thereby it was confirmed that the thin film was a porous body.

Example 19

Figure 3:
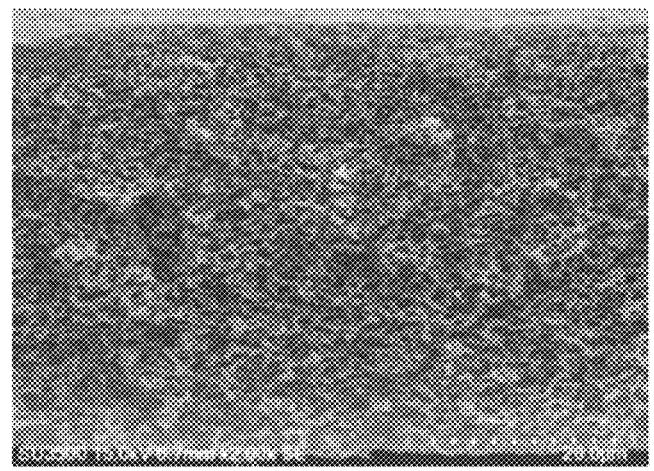
FIG. 3 is a SEM photograph of a cross section of a thin film obtained in Example 19.

A thin film was obtained using the same procedure as that used in Example 17, except that 2.5 mL of 1,6-hexane diol was used as the poor solvent. A cross section of the obtained thin film was observed using a SEM, and thereby it was confirmed that the thin film was a porous body. For reference purposes, a SEM photograph of a cross section of the thin film obtained in Example 19 is shown in FIG. 3.

Example 20

A thin film was obtained using the same procedure as that used in Example 17, except that 5 mL of 1-hexanol was used as the poor solvent. A cross section of the obtained thin film was observed using a SEM, and thereby it was confirmed that the thin film was a porous body.

Example 21

Figure 4:
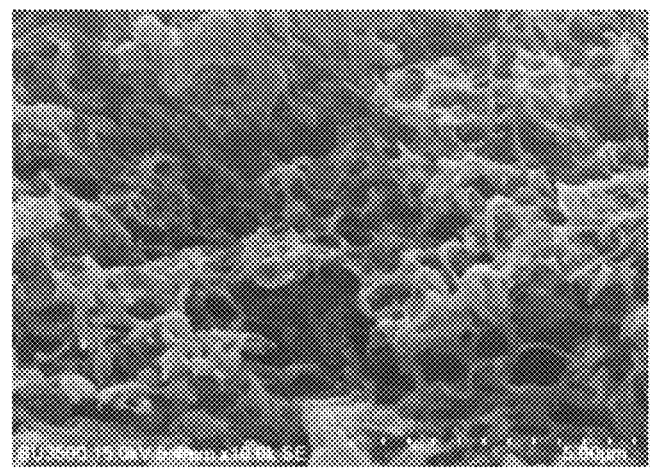
FIG. 4 is a SEM photograph of a cross section of a thin film obtained in Example 21.

To a sample bottle, 0.5 mL of a 5 mass % N-methylpyrrolidone (NMP) solution of poly(vinylidene fluoride) (PVdF) was added. To this was added 0.5 mL of 1,4-butane diol as a poor solvent. The sample bottle was heated to 80° C. to 90° C. and stirred until the PVdF completely dissolved in these solvents, thereby obtaining a solution of PVdF. The PVdF solution was then cooled to 25° C. The PVdF solution was then coated on an aluminum sheet by casting. This was then placed in a drier set to 120° C. and heated, thereby removing the good solvent and the poor solvent by vaporization. A thin film was obtained on the aluminum sheet in this way. A cross section of the obtained thin film was observed using a SEM, and thereby it was confirmed that the thin film was a porous body. For reference purposes, a SEM photograph of a cross section of the thin film obtained in Example 21 is shown in FIG. 4.

Example 22

A thin film was obtained using the same procedure as that used in Example 21, except that 0.5 g of glycerin was used as the poor solvent. A cross section of the obtained thin film was observed using a SEM, and thereby it was confirmed that the thin film was a porous body.

Measurement of Porosity

Samples were prepared by punching out the thin films obtained in the examples to a predetermined size. The weights and film thicknesses of these samples were determined. From the area and film thickness of a sample, the volume of the sample was determined and the apparent density was calculated. The porosity was calculated from the true density of the water-insoluble polymer that constitutes the thin film, using the formula below. The results are shown in Table 1.

Porosity (%)=(1−apparent density/true density)×100

From the results in Table 1, it can be confirmed that a porous body of a water-insoluble polymer can be produced using the method of the present disclosure.

TABLE 1

|  | Polymer | | Good solvent | | Poor solvent | | |
| --- | --- | --- | --- | --- | --- | --- | --- |
|  | Type | Usage amount (g) | Type | Usage amount (mL) | Type | Usage amount (mL) | Porosity (%) |
| Example 1 | EVOH-1 | 1 | nPA/water | 3.5/1.5 | GBL | 1 | 65.9 |
| Example 2 | EVOH-1 | 1 | DMSO | 4 | PC | 2.5 | 56.8 |
| Example 3 | EVOH-1 | 1 | DMSO | 5 | PC | 2.5 | 51.8 |
| Example 4 | EVOH-1 | 0.5 | nPA/water | 1.25/1.25 | Sulfolane | 1 | 74.3 |
| Example 5 | EVOH-1 | 0.5 | nPA/water | 1.25/1.25 | GBL | 1 | 72.4 |
| Example 6 | EVOH-1 | 0.5 | nPA/water | 1.25/1.25 | PGM | 1 | 48.8 |
| Example 7 | EVOH-1 | 1 | nPA/water | 1.5/3.5 | Sulfolane | 2 | 70.2 |
| Example 8 | EVOH-1 | 1 | nPA/water | 1.5/3.5 | GBL | 2 | 69.7 |
| Example 9 | EVOH-1 | 1 | nPA/water | 1.5/3.5 | PGM | 2 | 65.1 |
| Example 10 | EVOH-1 | 1 | nPA/water | 2.5/2.5 | 2-ethoxyethanol | 2 | 66.0 |
| Example 11 | EVOH-1 | 1 | nPA/water | 1.5/3.5 | 2-ethoxyethanol | 2 | 50.1 |
| Example 12 | EVOH-1 | 1 | DMSO | 5 | 1,6-hexane diol | 2.5 | 37.8 |
| Example 13 | EVOH-1 | 1 | DMSO | 5 | Sulfolane | 2.5 | 61.9 |
| Example 14 | EVOH-1 | 1 | nPA/water | 1.5/3.5 | DEGEE | 2 | 66.2 |
| Example 15 | EVOH-1 | 1 | DMSO | 5 | GBL | 2.5 | 65.3 |
| Example 16 | EVOH-2 | 1 | DMSO | 5 | GBL | 2.5 | 44.0 |
| Example 17 | CA | 1 | DMF | 5 | 1,3-butane diol | 2.5 | 24.6 |
| Example 18 | CA | 1 | DMF | 5 | 1,4-butane diol | 2.5 | 16.2 |
| Example 19 | CA | 1 | DMF | 5 | 1,6-hexane diol | 2.5 | 45.2 |
| Example 20 | CA | 1 | DMF | 5 | 1-hexanol | 5 | 15.1 |
| Example 21 | PVdF | Approx. 0.26 | NMP | Approx. 0.49 | 1,4-butane diol | 0.5 | 59.4 |
| Example 22 | PVdF | Approx. 0.26 | NMP | Approx. 0.49 | Glycerin | Approx. 0.4 | 42.7 |

What is claimed is:

1. A method of producing a porous body of a water-insoluble polymer, the method comprising the steps of:
    preparing a solution in which a water-insoluble polymer is dissolved in a mixed solvent containing a good solvent for the water-insoluble polymer and a poor solvent for the water-insoluble polymer; and
    removing the mixed solvent from the solution by vaporization, wherein
    the poor solvent has a boiling point higher than a boiling point of the good solvent,
    a porous body is obtained by removing the mixed solvent by vaporization to form pores, the water-insoluble polymer is an ethylene-vinyl alcohol copolymer, the good solvent is dimethyl sulfoxide or a mixed solvent of water and propyl alcohol, the poor solvent is propylene carbonate, or an ether group-containing monool, and the porous body is a separation membrane.

2. The production method according to claim 1, wherein the boiling point of the poor solvent is at least 10° C. higher than the boiling point of the good solvent.

3. The production method according to claim 1 wherein the porous body has one main surface and another main surface, and the porous body has a three-dimensional network-shaped porous structure in which pores are connected from the one main surface to the another main surface.

4. The production method according to claim 1 wherein the obtained porous body has a porosity 61.5% or more.

5. The production method according to claim 1 wherein the obtained porous body has a porosity 72.4% or more.

6. The production method according to claim 1 wherein the obtained porous body has an average pore diameter of 0.9 μm or more and 5 μm or less.

7. The production method according to claim 4 wherein the obtained porous body has an average pore diameter of 0.9 μm or more and 5 μm or less.

8. The production method according to claim 1 wherein an average degree of polymerization of the ethylene-vinyl alcohol copolymer is 100 or more and 200,000 or less.

9. The production method according to claim 1 wherein a content of ethylene units in the ethylene-vinyl alcohol copolymer 20 mol % or more and 50 mol % or less.

10. The production method according to claim 1 wherein a content of ethylene units in the ethylene-vinyl alcohol copolymer 25 mol % or more and 45 mol % or less.

11. The production method according to claim 1 wherein, in the preparing step, a mixing amount of the water-insoluble polymer is 1 part by mass or more and 40 parts by mass or less relative to 100 parts by mass of the good solvent, and a mixing amount of the poor solvent is 10 parts by mass or more and 400 parts by mass or less relative to 100 parts by mass of the good solvent.

12. The production method according to claim 1 wherein, in the preparing step, a mixing amount of the water-insoluble polymer is 10 parts by mass or more and 30 parts by mass or less relative to 100 parts by mass of the good solvent, and a mixing amount of the poor solvent is 30 parts by mass or more and 100 parts by mass or less relative to 100 parts by mass of the good solvent.

* * * * *